Nov. 3, 1931.  F. NIBLOCK  1,830,128
MILLING MACHINE ATTACHMENT
Filed Oct. 12, 1929   3 Sheets-Sheet 1
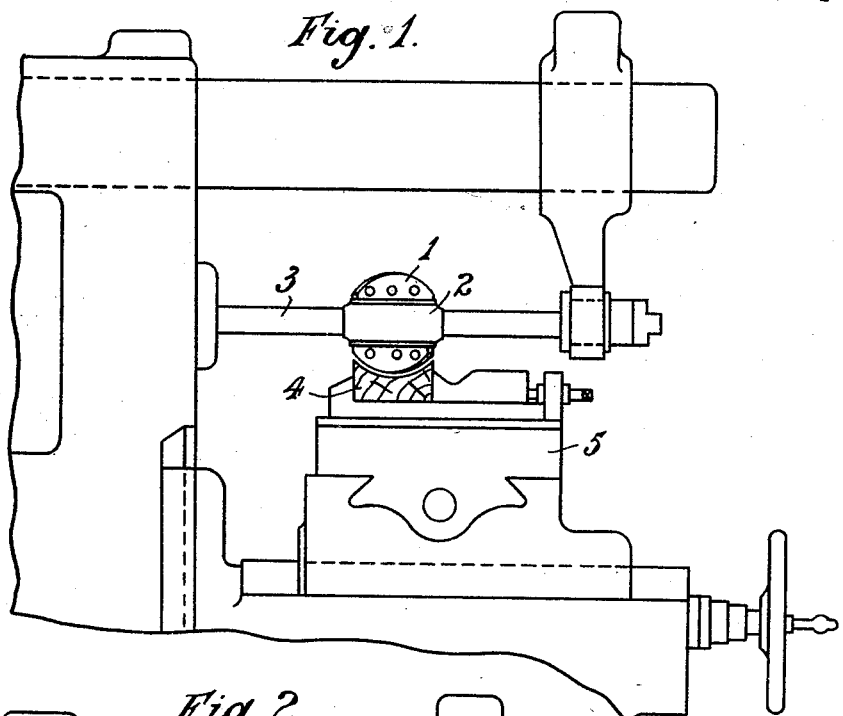
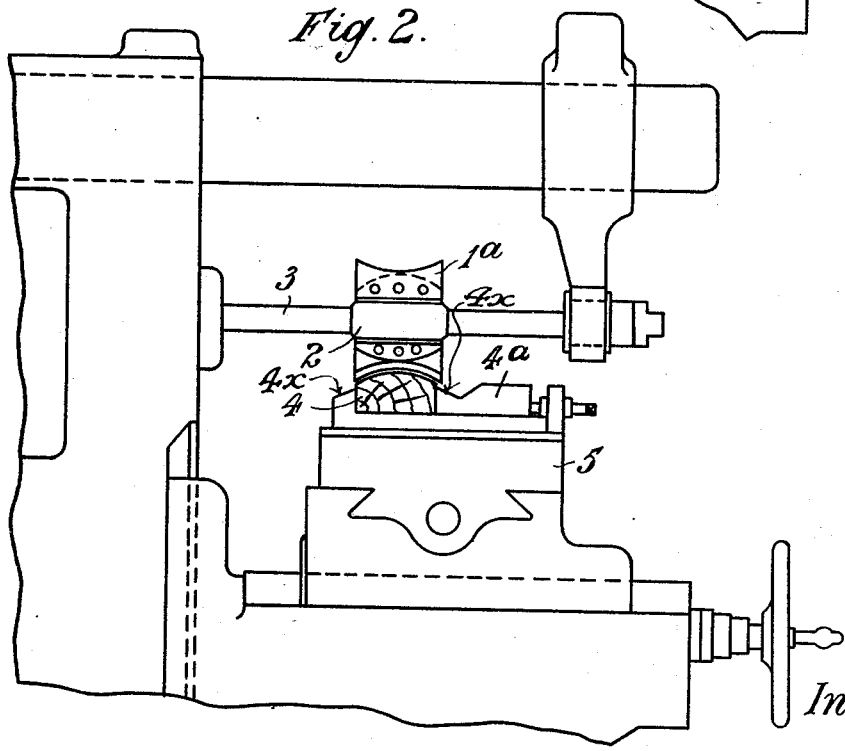
Inventor:
Frederick Niblock,
By Spear Middleton Donaldson Hall
Attys.

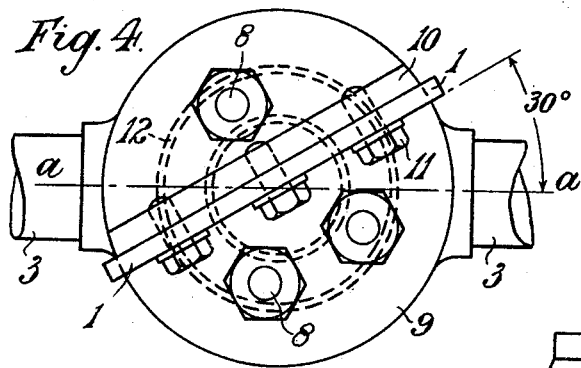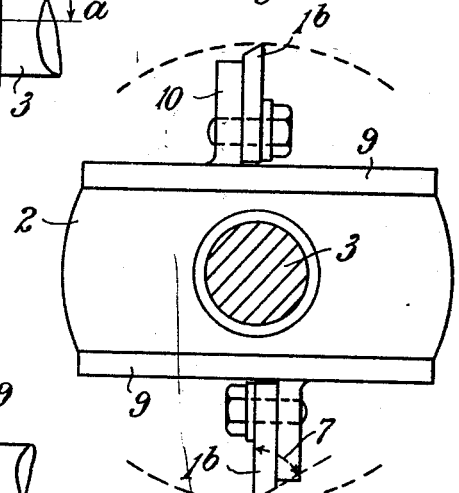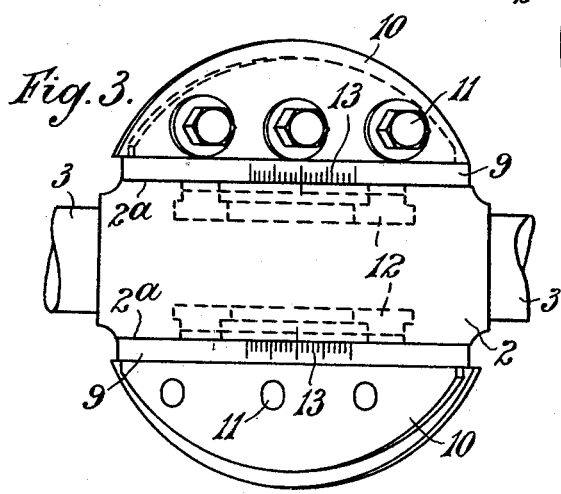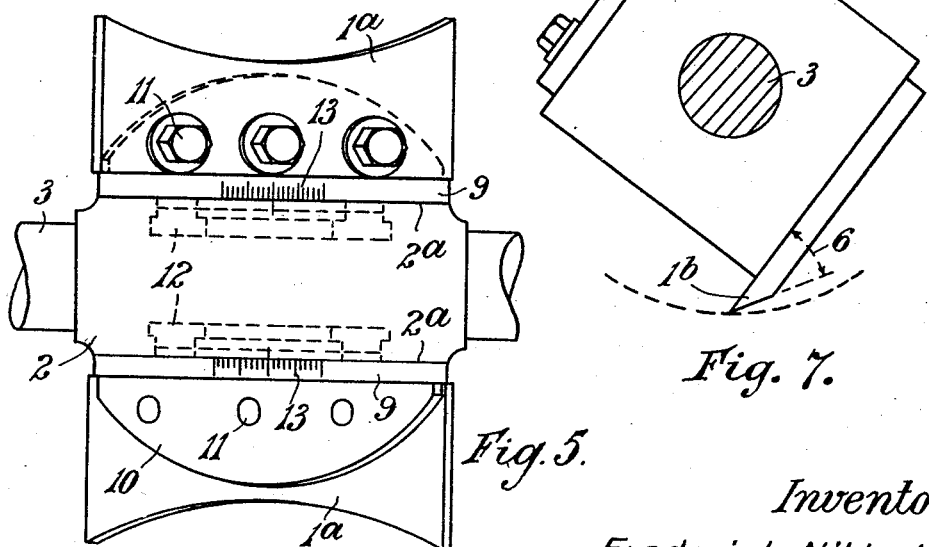

Nov. 3, 1931.  F. NIBLOCK  1,830,128
MILLING MACHINE ATTACHMENT
Filed Oct. 12, 1929   3 Sheets-Sheet 3
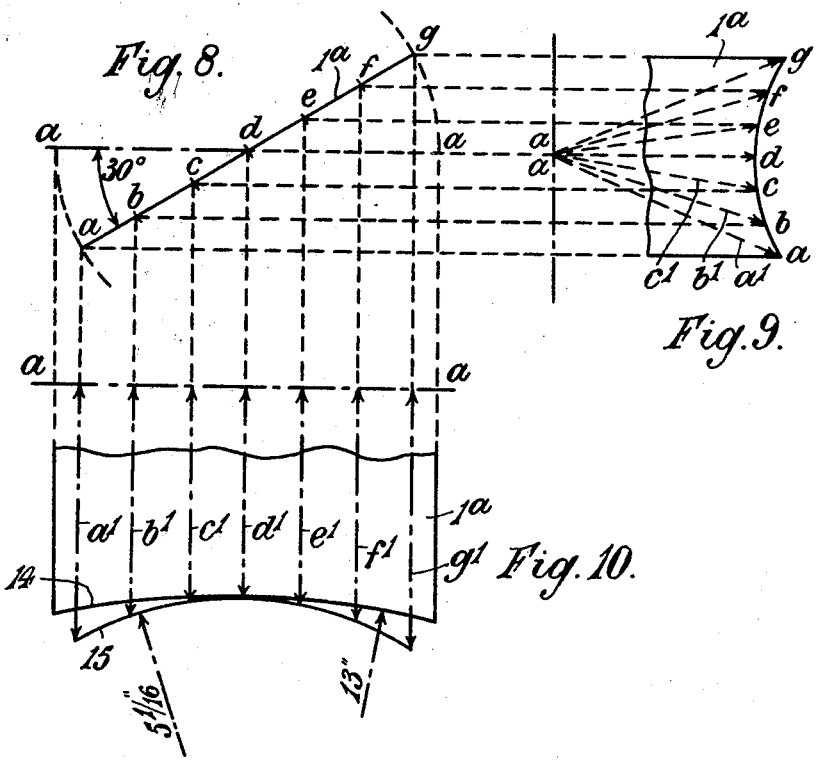
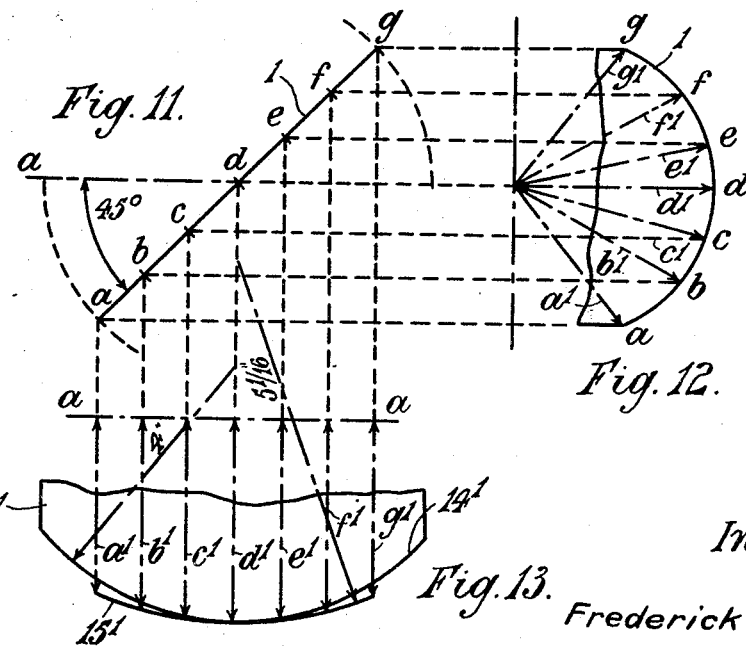
Inventor:
Frederick Niblock,
By *Spear Middleton Donaldson & Hall*
Attys.

Patented Nov. 3, 1931

1,830,128

UNITED STATES PATENT OFFICE

FREDERICK NIBLOCK, OF SINGAPORE, STRAITS SETTLEMENTS

MILLING MACHINE ATTACHMENT

Application filed October 12, 1929, Serial No. 399,279, and in Great Britain October 17, 1928.

This invention relates to a cutter or attachment for fitting to the mandril of a milling or similar machine, the cutting attachment being particularly useful for machining lignum vitæ or other hard wood strips for lining stern tube bearings of ships or the like. Such lignum vitæ strips are at present shaped by hand to a template before fitting and this operation is exceedingly tedious in order to produce accuracy in the curvature of the strips. Where the work has been done in a machine the rotary spindle of the apparatus has been provided with fixed cutters, the cutter blades being mounted tangentially to the spindle. In such an arrangement owing to the necessarily very acute angle of the cutting edge of the cutters, namely about 35°, in order to provide the requisite clearance, the cutting edge was so thin that under the high speed of rotation in cutting hard woods such as lignum vitæ the cutting edge became overheated and was soon burned off. Further, such fixed cutters were adapted to cut only one particular radius of curvature.

According to this invention a cutter or cutters is or are fitted to the mandril the profile of the cutters being a segment of a circle either convex or concave, the convex cutters machining the bore of the lignum vitæ strips while the concave cutters are designed for the exterior of such strips. The cutters are preferably fitted to a boss or the like on the mandril in such manner that they are symmetrically disposed about and can be turned to any desired angle relatively to the axis of the mandril and in this way the curvature of the resultant cut may be varied. In an alternative arrangement instead of being angularly adjustable the cutters are fixed.

Apparatus in accordance with this invention is illustrated in the accompanying drawings in which Fig. 1 is a fragmentary elevation showing a milling machine fitted with adjustable convex cutters adapted for machining lignum vitæ strips. Fig. 2 is a view analogous to Fig. 1 showing the machine fitted with concave cutters. Fig. 3 is a detail elevation to a larger scale of the mandril boss fitted with convex cutters and Fig. 4 is a plan of Fig. 3. Fig. 5 is a view analogous to Fig. 3 showing the boss fitted with concave cutters. Fig. 6 is an end view of Fig. 3 and Fig. 7 is a diagrammatic end view showing the usual manner of fixedly mounting rotary cutters. Figs. 8, 9 and 10 are diagrammatic plan, end view, and elevation respectively, showing the development of the resulting convex cut when a concave cutter is set at an angle to its axis of revolution and Figs. 11, 12 and 13 are analogous diagrammatic views showing the development of the resulting concave cut when a convex cutter is set at an angle to its axis of revolution.

In carrying out the invention the convex cutters 1 or concave cutters 1a are secured to a boss or block 2 on the mandril 3 of the milling or other machine, the mandril being adapted to be driven at a high speed and the work such as the lignum vitæ pieces 4 are held in any suitable attachment such as a vice 4a and adapted to be traversed, say, on the carrier 5 past the revolving cutters. If the cutters are permanently fixed to the block 2 they are so disposed that the cutting faces 1b, Fig. 6, are inclined to the axis a—a of the mandril 3. Previously such cutters have been mounted relatively to the mandril as shown in Fig. 7 that is to say with their cutting faces 1b parallel and tangential to the mandril axis. As a result of this latter arrangement the angle 6 of the cutting edge was required to be very acute so as to clear the cut and owing to the high speed of rotation and the consequent overheating of the cutters when machining hard wood such as lignum vitæ the cutting edge was soon lost. By mounting the cutters as shown in Fig. 6 with their cutting faces radial to the mandril 3 a much more obtuse angle of cutting edge 7 is possible, namely, as high as 75° with a consequent much greater endurance of the cutting edge.

Such an arrangement of fixedly mounting the cutter blades on the mandril necessitates special cutters being ground for any particular radius of curvature desired in the lignum vitæ segments, and to avoid this I preferably propose to mount the cutters, concave or convex, on the boss 2 of the mandril so that they may be turned to any desired angle relatively to the mandril axis, various curvatures of cut being thus obtained from the same cutters, according to their angular position. With this object the boss 2 is provided with oppositely disposed faces 2a to which are secured by bolts 8 discs 9 having webs 10 to which the cutters are secured by screws 11. The bolts 8 have T-heads which engage beneath the shoulders of a circular groove 12 in the boss 2. Consequently by adjustment of the securing bolts 7 the cutters may be set with their cutting faces 1b making any desired angle with the mandril axis. By graduating the flanges 9 of the cutter discs as shown at 13, Figs. 3 and 5, both cutters may be set accurately to the same angle.

When the cutters, convex, or concave, are clamped on the boss 2 so that the cutting faces 1b are in the plane of the mandril axis, the resulting cut will of course be of the same curvature as the normal profile of the cutting edge of the cutter. If, however, the cutters are turned and set at an angle relatively to the axis of the mandril, as shown in Fig. 4, a partially shearing cut is obtained and the curve of the cut changes. Owing to the obliquity of the cutter each point along its cutting edge other than the central point is now at a different radial distance from the axis of the mandril than when the cutter was in the plane of the axis. Figs. 8, 9 and 10 show the development of the resulting convex cut obtained from a concave cutter 1a when such cutter is set at an angle of 30° to the axis a—a of the mandril as in Fig. 4, the normal circular profile of the cutter 1a being shown at 14, Fig. 10. As will be seen from the plan and end views, Figs. 8 and 9, the points $a$, $b$, $c$, $d$, $e$, $f$, $g$, on the cutter 1a are now at the radial distances $a'$, $b'$, $c'$, etc., from the axis of rotation a—a and as will be seen on the elevation Fig. 10 these radial distances produce a curve 15 of shorter chord and smaller radius of curvature which will be the resultant cut. For instance if the normal profile 14 of the cutter be of a radius of 13 inches, when the cutter is set at 30° the resulting curve 15 will approximate to a circle of $5\frac{1}{16}$ inches radius. Similarly if the same concave cutter 1a be set at an angle of 20° the resulting cut 15 will have a radius of 7⅝ inches while if the cutter be set at an angle of 15° the resulting cut will have a radius of 9½ inches.

In the same way as will be understood from Figs. 11, 12 and 13, which relate to a convex cutter, if the cutter 1 be set in the plane of the rotational axis a—a the resulting concave cut would be that of the normal profile 14' of the cutter, while if the cutter be set at an angle of 45°, as shown, the resulting cut 15' would, if the normal radius of the cutter be 4 inches, now be a curve of a radius of $5\frac{11}{16}$ inches. Similarly, if the convex cutter 1 be set at an angle of 55° the same cutter will cut a curve of 10 inches radius and if the cutter be set at 30° it will produce a curve of $4\frac{7}{16}$ inches radius.

I have found that a concave cutter of width 6 inches, the curved profile of which is 13 inches radius, and the lowest point of the curve set at a radius of $3\frac{3}{16}$ inches from the axis of rotation, gives a range of convex cuts extending from 26 inches down to 9 inches diameter, according to the angle to which the cutter is set, and similarly a convex cutter of width 6 inches, the curved profile of which is 4½ inches radius and the highest point of the curve set at a radius of $3\frac{3}{16}$ inches from the axis of rotation, produces concave cuts varying from 9 inches up to 24 inches diameter.

The above range of concave and convex cuts is sufficient for all ordinary purposes covering the requisite curvatures for the interior and exterior of lignum vitæ bushes made up from strips for use in lining the stern tube bearings of propeller shafts or the barrels of winches or the like, but while the above combinations or normal curvature of cutter, width of cutter and diameter of revolution of cutter have been found suitable for most purposes, many other combinations of these factors can be employed to produce similar and other curves.

While it is preferable to have two or more cutters mounted on the rotary spindle, a single cutter blade mounted on the spindle in the way described would be quite effective.

Both the resulting concave and convex cuts though not truly circular in section, yet over the comparatively narrow widths of the wood segments approximate so closely to a circular curve as to be almost indistinguishable therefrom when tested with a gauge.

Though it is preferred so to mount the cutters that they may be angularly adjustable as described relatively to the mandril axis, such cutters having a curved profile of cutting edge, convex or concave, may be arranged to be fixedly mounted at an angle relatively to the mandril axis, and if the required combination of cutter profile curvature, angle at which the cutter is set, and effective radius from the mandril axis be maintained, as for instance in the examples given, an approximately true circular cut will be obtained on a comparatively narrow strip.

In Fig. 2 the vice is shown with jaws bevelled at 4x. When using a concave cutter as shown in said Fig. 2 the bevelled jaws are desirable because the cutter having necessarily to overhang the work at the sides thereof would engage the vice.

I claim:—

1. Apparatus for machining lignum vitæ or other strips comprising, a rotary spindle or mandril, a cutter blade having a cutting edge the profile of which is a segment of a circle, said blade being so mounted on the mandril that it is capable of angular adjustment about an axis lying in the cutting face of the blade and radial to the axis of the mandril, whereby the cutting edge of the blade remains symmetrical to the cutter axis at any angularity of the blade.

2. Apparatus for machining lignum vitæ or other strips comprising a rotary spindle or mandril, a cutter blade having a cutting edge the profile of which is a segment of a circle, said blade being so mounted on the mandril that it is capable of angular adjustment about an axis lying in the cutting face of the blade and radial to the axis of the mandril, whereby the cutting edge of the blade remains symmetrical to the cutter axis at any angularity of the blade, and means for securing the cutter in its adjusted position.

3. Apparatus for machining lignum vitæ or other strips comprising a rotary spindle or mandril, a boss on said mandril, a cutter blade having a cutting edge the profile of which is a segment of a circle, a disc element to which the cutter blade is detachably secured, said disc being so mounted on the boss that it and the cutter blade are capable of angular adjustment about an axis lying in the cutting face of the blade and radial to the axis of the mandril, whereby the cutting edge of the blade remains symmetrical to the cutter axis at any angularity of the blade.

4. Apparatus for machining lignum vitæ or other strips comprising a rotary spindle or mandril, a boss on said mandril, a circular groove in the boss, a cutter blade having a cutting edge the profile of which is a segment of a circle, a disc element to which the cutter blade is detachably secured, said disc being so mounted on the boss that it and the cutter blade are capable of angular adjustment about an axis lying in the cutting face of the blade and radial to the axis of the mandril, whereby the cutting edge of the blade remains symmetrical to the cutter axis at any angularity of the blade, and bolts engaging the boss groove for securing the disc and cutter in their adjusted position.

In testimony whereof I affix my signature.

FREDERICK NIBLOCK.